US 011772777B2

(12) United States Patent
Dejeu et al.

(10) Patent No.: US 11,772,777 B2
(45) Date of Patent: *Oct. 3, 2023

(54) VARIABLE PITCH BLADED DISC

(71) Applicant: SAFRAN AIRCRAFT ENGINES, Paris (FR)

(72) Inventors: Clement Marcel Maurice Dejeu, Moissy-Cramayel (FR); Jonathan Evert Vlastuin, Moissy-Cramayel (FR); Mathieu Simon Paul Gruber, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,277

(22) Filed: Jun. 7, 2021

(65) Prior Publication Data

US 2021/0291962 A1    Sep. 23, 2021

Related U.S. Application Data

(63) Continuation of application No. 15/506,937, filed as application No. PCT/FR2015/052296 on Aug. 28, 2015, now Pat. No. 11,046,424.

(30) Foreign Application Priority Data

Aug. 29, 2014   (FR) ...................................... 1458125

(51) Int. Cl.
*B64C 11/06*   (2006.01)
*B64C 11/32*   (2006.01)
(Continued)

(52) U.S. Cl.
CPC .............. *B64C 11/30* (2013.01); *B64C 11/06* (2013.01); *B64C 11/32* (2013.01); *B64C 11/48* (2013.01);
(Continued)

(58) Field of Classification Search
CPC ... B64C 11/301; B64C 11/303; B64C 11/306; B64C 11/32; B64C 11/34; B64C 11/36;
(Continued)

(56) References Cited

U.S. PATENT DOCUMENTS 2,982,361 A * 5/1961 Rosen ..................... B64C 11/48
                                                    415/129
4,641,039 A * 2/1987 Carre .................... F03D 7/0224
                                                    416/41
(Continued)

FOREIGN PATENT DOCUMENTS

FR    1 458 125 A    11/1966
FR    2 942 454 A1   8/2010
(Continued)

OTHER PUBLICATIONS

International Search Report issued in PCT/FR2015/052296 dated Nov. 30, 2015 (w/ English translation).
(Continued)

*Primary Examiner* — Justin D Seabe
(74) *Attorney, Agent, or Firm* — Oblon, McClelland, Maier & Neustadt, L.L.P.

(57) ABSTRACT

A variable pitch bladed disc including a plurality of blades, each being of variable pitch about a blade axis of rotation and having a root, the plurality of blades including at least one first blade and at least one second blade, a plurality of rotor connecting shafts, each shaft having a root and a tip, the root of each blade being mounted on the tip of a corresponding rotor connecting shaft via a pivot so as to allow each blade to be rotated about the blade axis of rotation, the first blade having a first rotation axis inclination such that the rotation axis thereof is inclined in a fixed manner with respect to a radial axis passing through the root of the corresponding shaft, and the second blade has a (Continued)

second rotation axis inclination different from the first rotation axis inclination.

10 Claims, 13 Drawing Sheets

(51) Int. Cl.
  *B64C 11/30* (2006.01)
  *F02K 3/072* (2006.01)
  *F01D 1/26* (2006.01)
  *F01D 7/00* (2006.01)
  *B64C 11/48* (2006.01)
  *B64D 27/00* (2006.01)
  *F04D 29/36* (2006.01)

(52) U.S. Cl.
  CPC ............. *F01D 1/26* (2013.01); *F01D 7/00* (2013.01); *F02K 3/072* (2013.01); *B64D 2027/005* (2013.01); *F04D 29/362* (2013.01); *F05D 2220/325* (2013.01); *F05D 2220/36* (2013.01); *F05D 2250/314* (2013.01); *F05D 2260/74* (2013.01); *F05D 2260/79* (2013.01); *F05D 2260/961* (2013.01); *Y02T 50/60* (2013.01)

(58) Field of Classification Search
  CPC ......... B64C 11/46; B64C 11/50; B64C 11/48; B64C 11/30; F01D 7/00
  See application file for complete search history.

(56) References Cited

U.S. PATENT DOCUMENTS

| | | | | |
|---|---|---|---|---|
| 4,767,270 | A | * | 8/1988 | Seidel ................ F01D 5/225 416/129 |
| 4,863,351 | A | | 9/1989 | Fischer |
| 4,936,746 | A | * | 6/1990 | Mayo ................ B64C 11/306 416/128 |
| 6,042,333 | A | | 3/2000 | Day |
| 9,022,738 | B1 | * | 5/2015 | Silberg ................ B63G 8/16 416/141 |
| 2010/0215499 | A1 | | 8/2010 | Lafont |
| 2014/0017086 | A1 | * | 1/2014 | Charier ................ F04D 29/185 416/128 |
| 2015/0147181 | A1 | * | 5/2015 | Henze ................ B64C 11/18 416/215 |
| 2021/0291962 | A1 | | 9/2021 | Dejeu et al. |

FOREIGN PATENT DOCUMENTS

| | | | | |
|---|---|---|---|---|
| FR | 2 992 346 | A1 | | 12/2013 |
| WO | WO-2012131271 | A1 | * | 10/2012 .......... B64C 11/308 |
| WO | 2014/132022 | A2 | | 9/2014 |
| WO | WO 2016/030645 | A1 | | 3/2016 |

OTHER PUBLICATIONS

Search Report issued in French Patent Application No. 1458125 dated Apr. 28, 2015 (w/ English translation of categories of cited documents).

\* cited by examiner

VARIABLE PITCH BLADED DISC

CROSS-REFERENCE TO RELATED APPLICATIONS

This application is a continuation of U.S. Application Ser. No. 15/506,937 filed Feb. 27, 2017, the entire contents of which is incorporated herein by reference. U.S. application Ser. No. 15/506,937 is a 371 of International Application No. PCT/FR2015/052296 filed Aug. 28, 2015, and claims the benefit of priority from prior French Application No. 1458125 filed Aug. 29, 2014.

FIELD OF THE INVENTION

The invention relates to a variable pitch bladed disc, as well as to a turbine engine comprising such a variable pitch bladed disc.

STATE OF THE ART

Turbine engine bladed wheels comprising at least one rotor and blades with variable geometrical pitch, are known from the state of the art.

In the case of propeller—driven engines with one or several propellers, each propeller comprises a plurality of blades of a bladed wheel, the blades being positioned circumferentially to the periphery of the bladed wheel, the blades having the same geometrical configuration around the axis of the turbine engine or the axis of the propeller, the blades being driven into rotation by the rotor around this axis.

The system of blades with variable pitch gives the possibility of modifying the pitch of all the blades in an identical way so as to adapt the aerodynamic operation of the blades of the propeller to the variation of the flight conditions. This variation may result either from a change in the flight point pair (z altitude, Mn Mach) or in the rotary condition of the propellers.

The propeller engine is for example a motor of the turboprop type.

This may also be an engine of the "open rotor" or "unducted fan" type, typically with an unducted fan and with contra rotative open rotor. The fan of a turbine engine of this type typically comprises two coaxial external propellers corresponding to two bladed wheels, respectively upstream and downstream, at least one of which is driven into rotation and which extend substantially radially outside the nacelle of this turbine engine, so as to have different speeds of rotation. For example, only one of the propellers may be driven, or the propellers may be contra rotative.

The geometrical pitch is typically the angle formed by the cord of the profile of the blade and the plane of rotation of the propeller, defined as the plane orthogonal to the axis of rotation of the propeller of the bladed wheel.

For this purpose, as illustrated in FIG. 1, a rotor is known comprising for each blade 2 of the propeller a radial shaft 6, a head 601 of which is bound to the blade 2 through a pivot 8 on which is housed a root of the blade 201.

The rotation of the radial shaft 6 may be controlled by the axial displacement of a connecting rod 9. An actuator (not shown) may control the axial displacement of the control rods 9, and thus adjust in a uniform way the pitch of the set of the blades 2 so as to systematically obtain the same pitch for all the blades.

The acoustic certification of an airplane is based on the EPNL ("Effective Perceived Noise Level") criterion, which aims at evaluating the noise levels of the airplane in the approach and take—off phases.

The EPNL also takes into account the discomfort perceived by the human ear, and caused by the different measured components of the noise spectra.

The propeller engines, as described above, generate for the human ear a significant noise during the approach and take—off phases, which limits their possibility of acoustic certification and therefore their application.

General Presentation of the Invention

A goal of the invention is to propose a bladed wheel with variable pitch giving the possibility of reducing the effective noise perceived by an observer on the ground during the take—off and approach phases at a low speed and produced by the turbine engine during operation.

In order to overcome the drawbacks of the state of the art, the invention proposes a bladed wheel with variable pitches comprising:

a plurality of blades, each with a variable pitch along an axis of rotation of a blade and each having a root, the plurality of blades comprising at least one first blade and at least one second blade, a plurality of rotor connection shafts, each shaft having a root and a head, the root of each blade being mounted on the head of a corresponding rotor connection shaft through a pivot so as to allow the rotation of each blade along the blade rotation axis, wherein the first blade has a first tilt of the axis of rotation, such that the blade rotation axis of the first blade is tilted in a fixed way with respect to a radial axis of the bladed wheel passing through the foot of the corresponding shaft, and the second blade has a second tilt of the axis of rotation different from the first tilt of the axis of rotation.

Such a bladed wheel gives the possibility of reducing the noise produced by the turbine engine during operation and perceived by the human ear.

Indeed, the global noise produced by an operating airplane comprises a first tone component, generated by the rotating portions of the airplane and/or by mechanisms generating vortices, and a second wide band component mainly generated by the interaction of turbulent structures (for example in the presence of a vortex or of wakes, typically at the limiting layers) with the bearing surfaces of the airplane.

The emergence of acoustic levels of lines of the first tone component with respect to the noise of the second wide band component causes a strong discomfort perceived by the human ear. Such an emergence is thus a strong penalty during the evaluation of the EPNL criterion.

When all the blades are distributed in a uniform way on the blading, like in existing engines, the specific noise of the bladed wheel thus consists of the fundamental line and of its harmonics.

The bladed wheel according to the invention has at its circumference a modified periodicity of the distribution of the blades, so as to distribute the acoustic energy making up the specific noise on several distinct frequencies.

The invention thus gives the possibility of reducing the emergence of lines of the specific noise of the bladed wheel with respect to the wide band level, and therefore of reducing the calculated EPNL levels as well as the perceived discomfort.

The invention is advantageously completed by the following features, taken alone or in any of their technically possible combinations:

the first tilt of the axis of rotation comprises a tangential tilt component in the plane of the bladed wheel;

the first tilt of the axis of rotation comprises a tilt component towards the upstream or the downstream side with respect to the plane of the propeller;

each shaft corresponding to a first blade is tilted with respect to the radial axis, tilting the first corresponding blade according to the first tilt of the axis of rotation, each shaft corresponding to a first blade has a joint tilting the head of the shaft with respect to the remainder of the shaft, and thus tilting the first corresponding blade according to the first tilt of the axis of rotation;

the first blade and the second blade have the same geometrical shape;

the first blade has a first blade tilt, such that the first blade is tilted in a fixed way with respect to the blade rotation axis of the first blade, and the second blade has a second blade tilt different from the first blade tilt;

the first blade and the second blade are configured so that the respective pitches along the corresponding blade axes of rotation are modified simultaneously, and so that:

when the bladed wheel is blocked in a high speed position, the position of the first blade with respect to the corresponding radial axis is the same as the position of the second blade with respect to the corresponding radial axis, when the bladed wheel is blocked in a low speed position, the position of the first blade with respect to the corresponding radial axis is different from the position of the second blade with respect to the corresponding radial axis.

The invention also relates to a turbine engine comprising such a first bladed wheel.

The invention is advantageously completed by the following features, taken alone or in any of their technically possible combinations:

a second bladed wheel, the second bladed wheel comprising a plurality of blades, the first bladed wheel being positioned upstream or downstream from the second bladed wheel along the axis of the turbine engine, so as to allow, during the operation of the turbine engine, a time and/or space phase shift of the interaction between the first blade of the first bladed wheel and the blades of the second bladed wheel, with respect to the interaction between the second blade of the first bladed wheel and the blades of the second bladed wheel;

both bladings have different speeds and/or directions of rotation.

SHORT DESCRIPTION OF THE FIGURES

Other features and advantages of the invention will become apparent during the description hereafter of an embodiment. On the appended drawings.

Figure 3A:
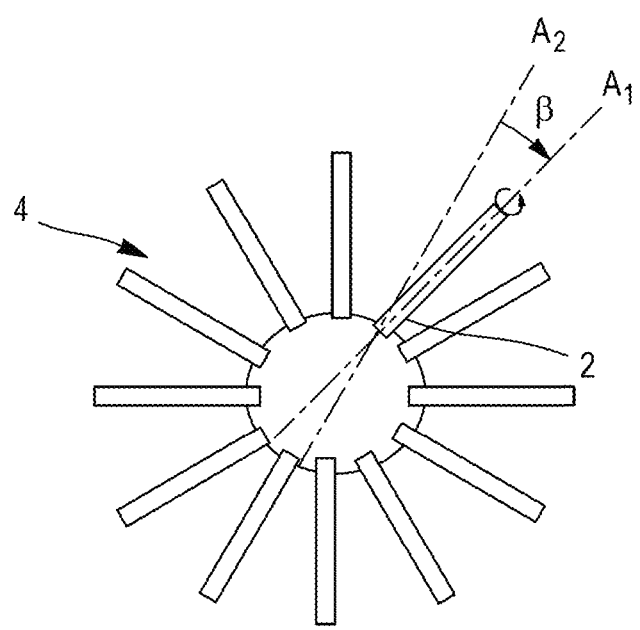
FIG. 3a is a schematic illustration of a first tilt of a tangential axis of rotation in the plane of the propeller of a bladed wheel according to an exemplary embodiment of the invention.
Figure 3B:
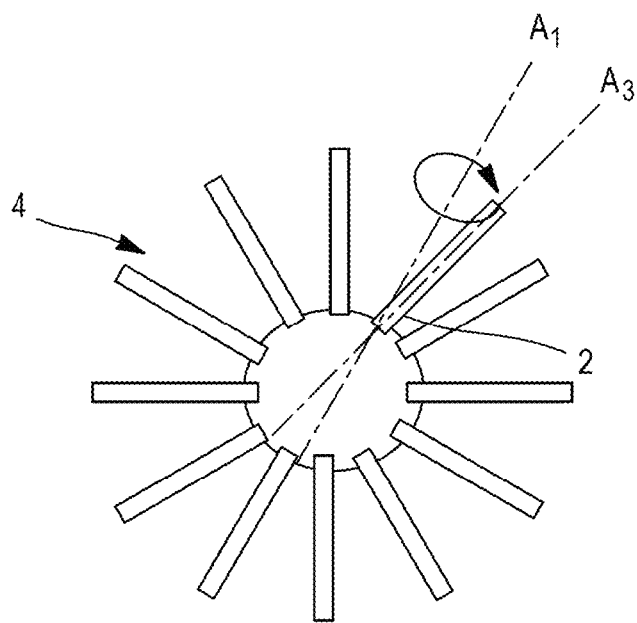
FIG. 3b is a schematic illustration of a first blade tilt of a bladed wheel according to exemplary embodiment of the invention.
Figure 3C:
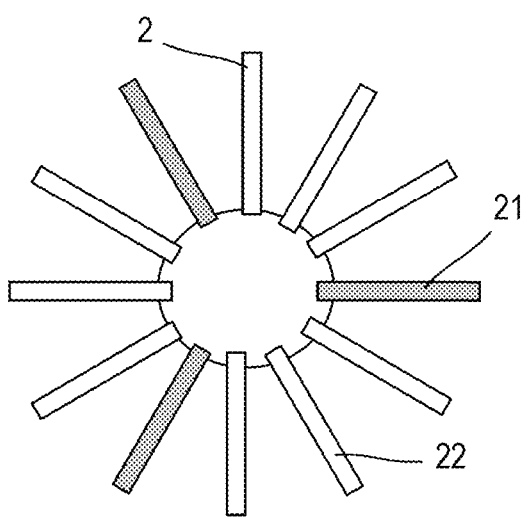
FIG. 3c is a schematic illustration of a bladed wheel according to another exemplary embodiment of the invention.
Figure 3D:
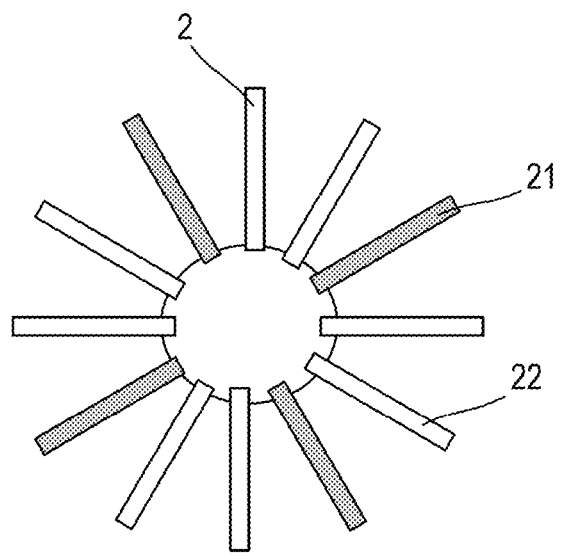
FIG. 3d is a schematic illustration of a bladed wheel according to another further exemplary embodiment of the invention.
Figure 4:
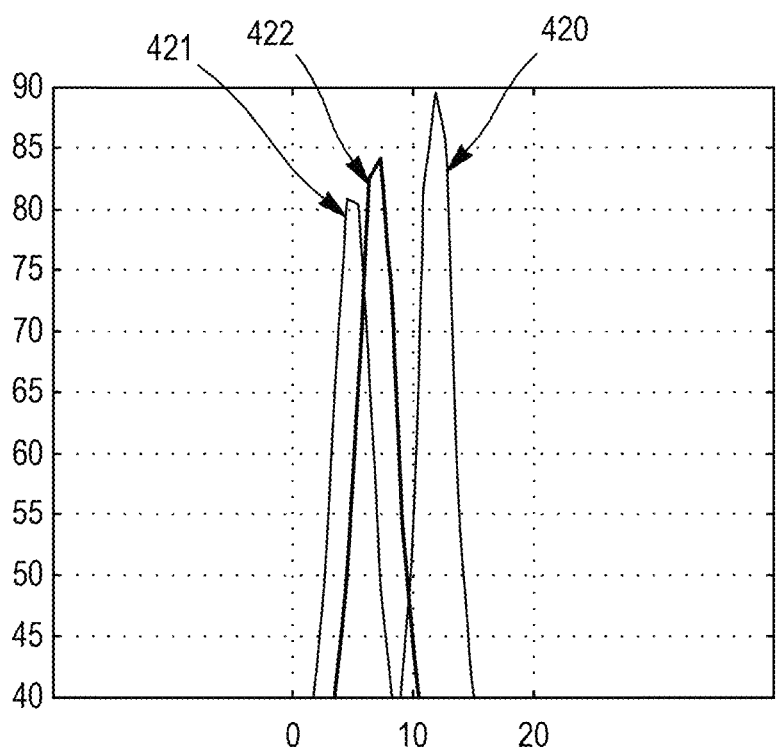
Figure 5:
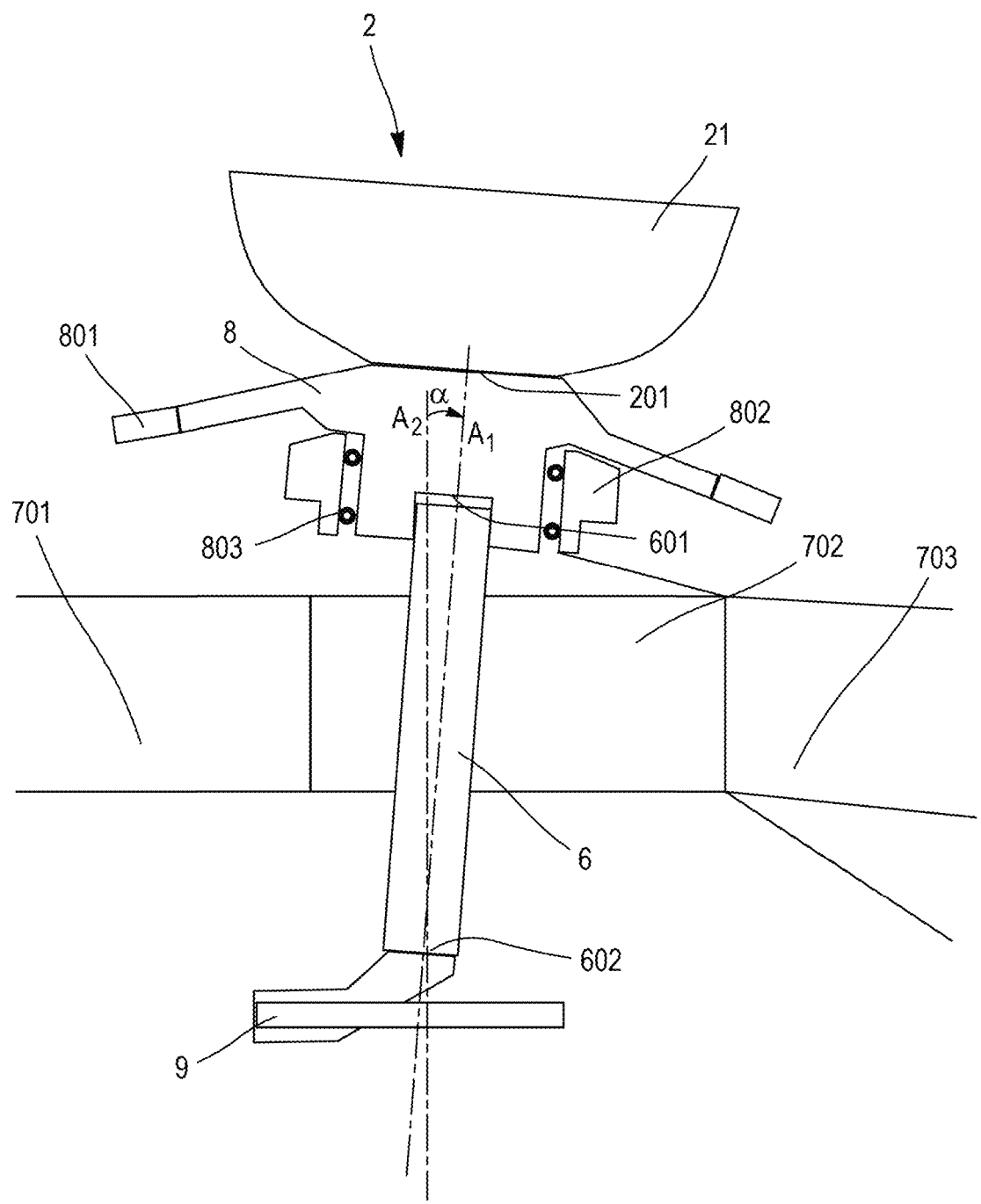
Figure 6:
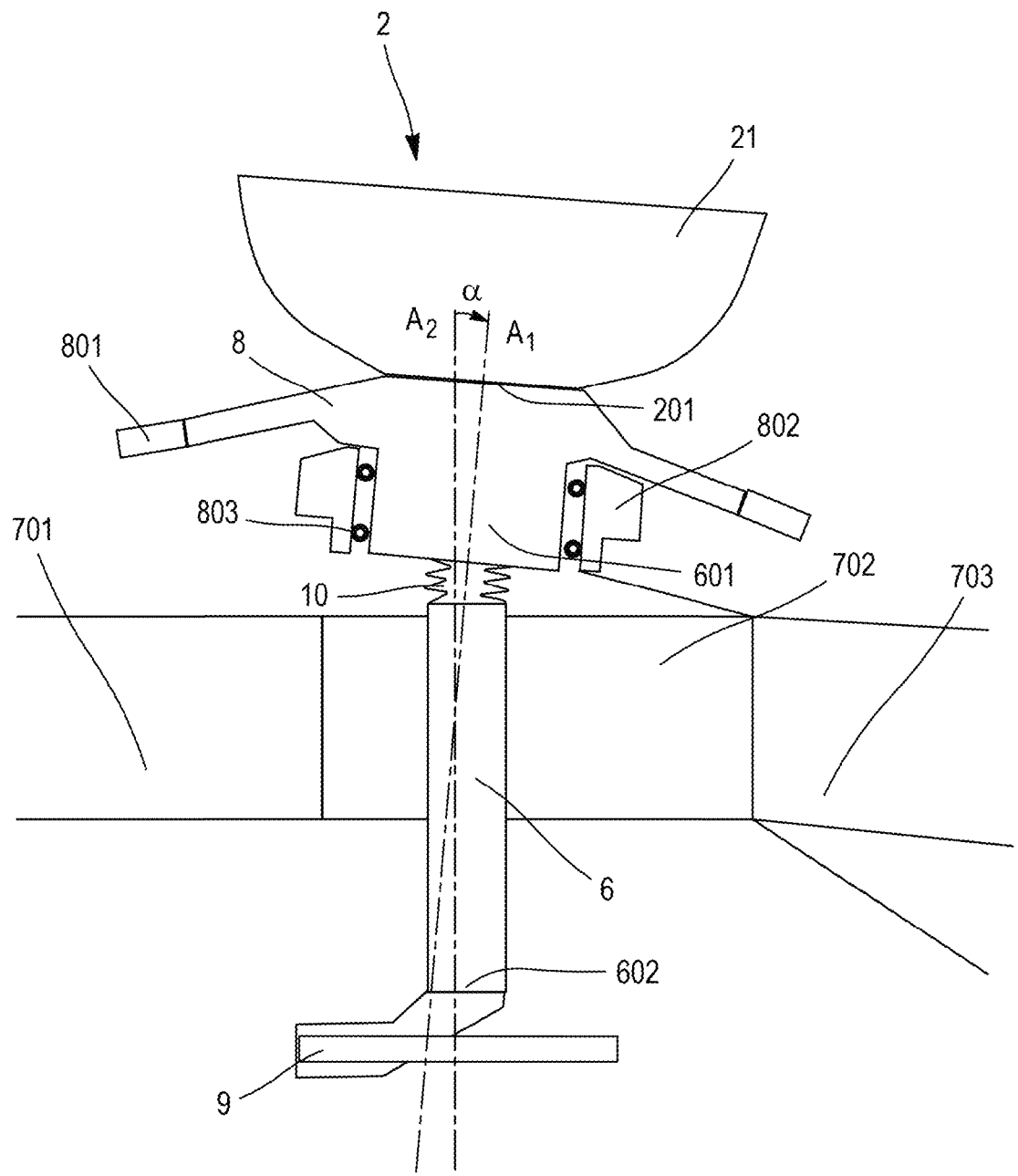
Figure 7:
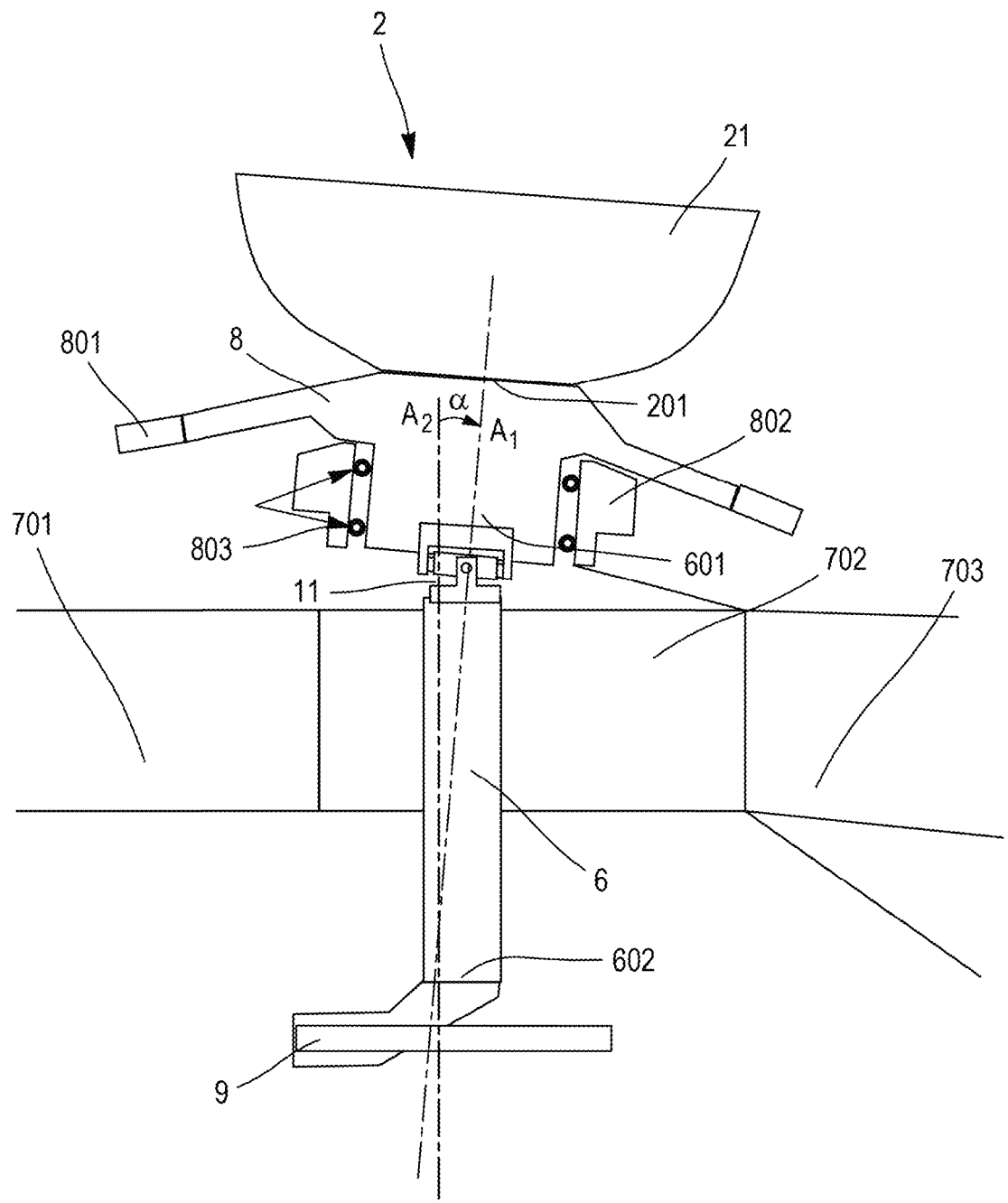
Figure 8:
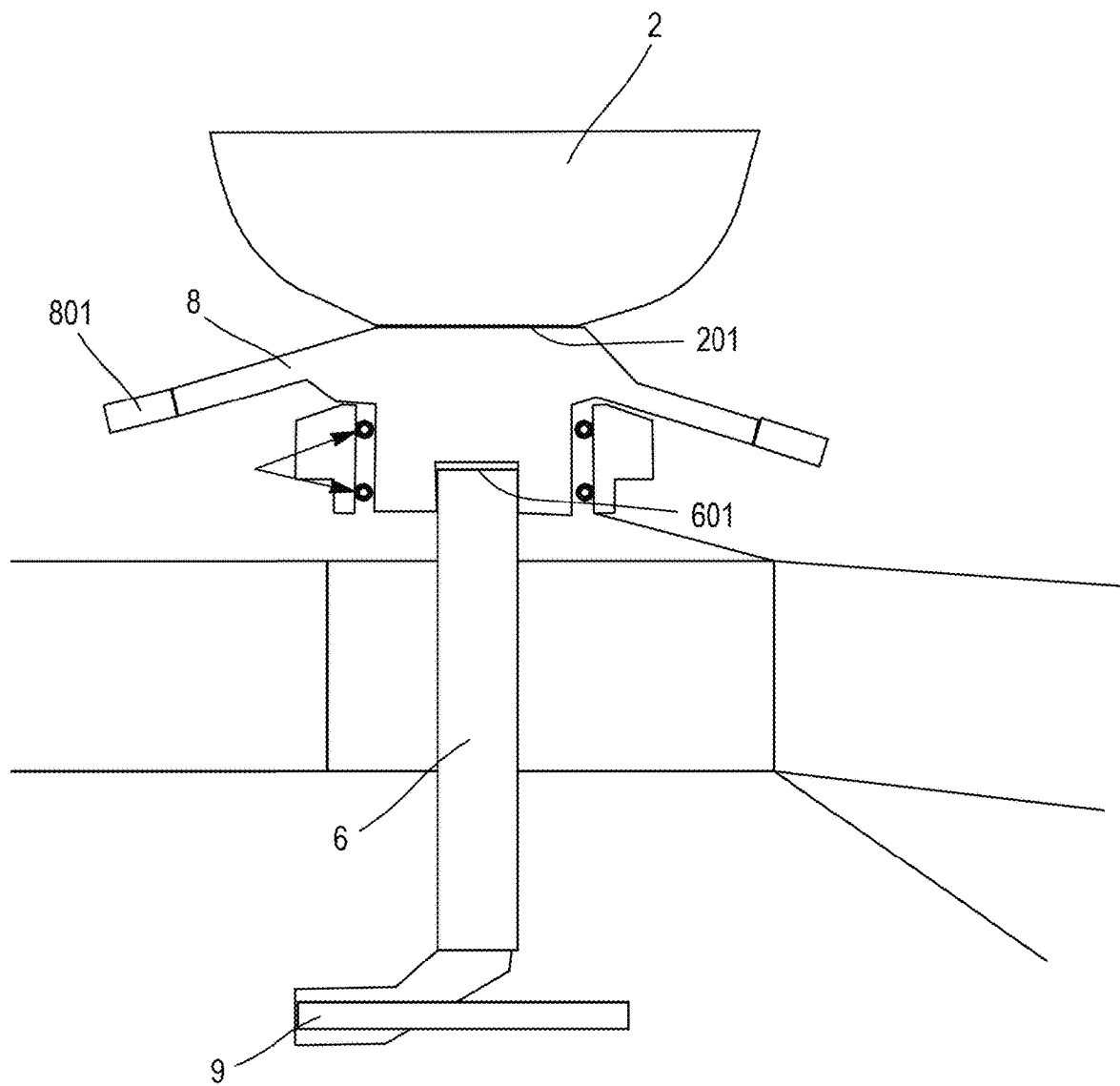
Figure 9:
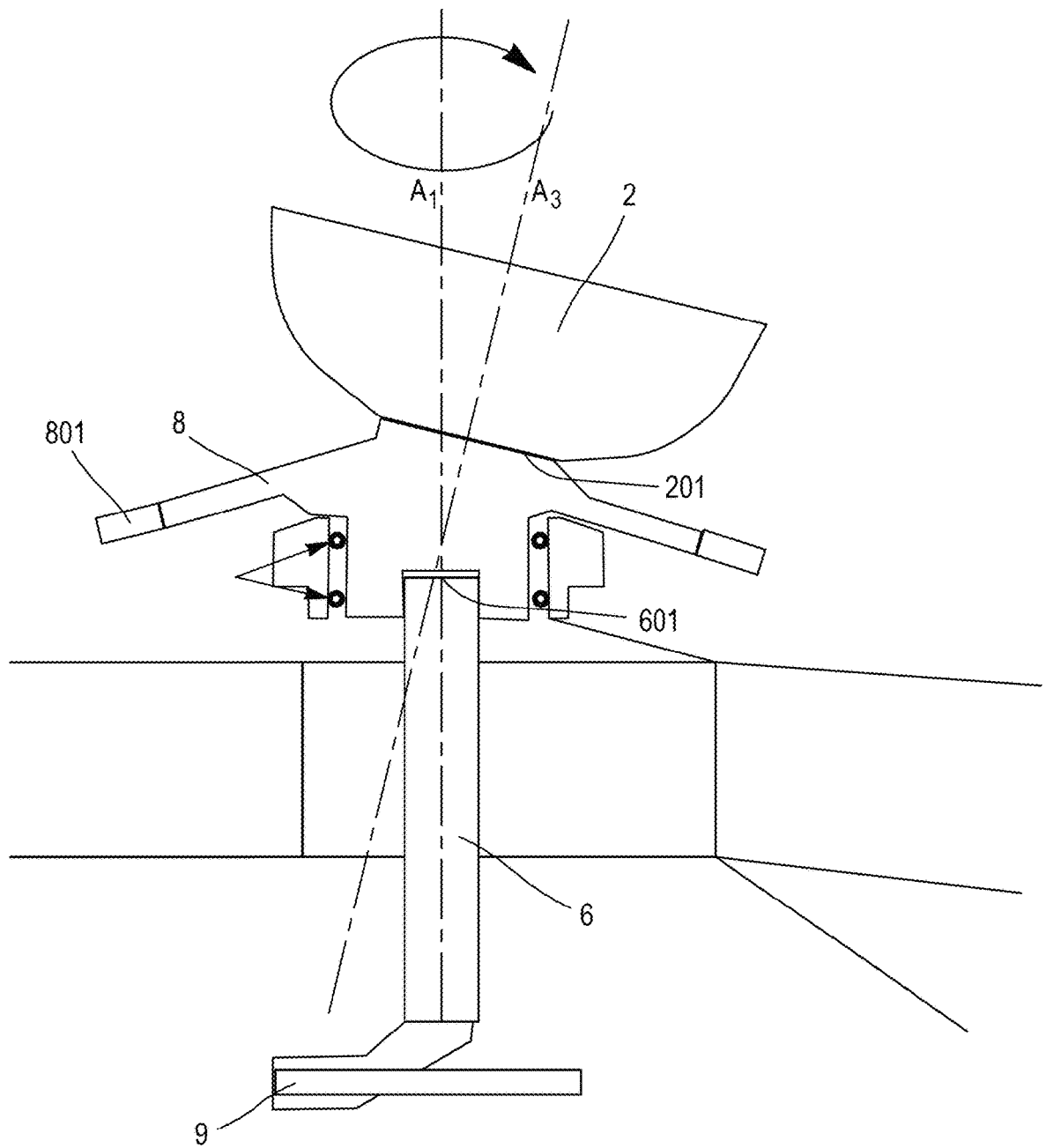
Figure 10:
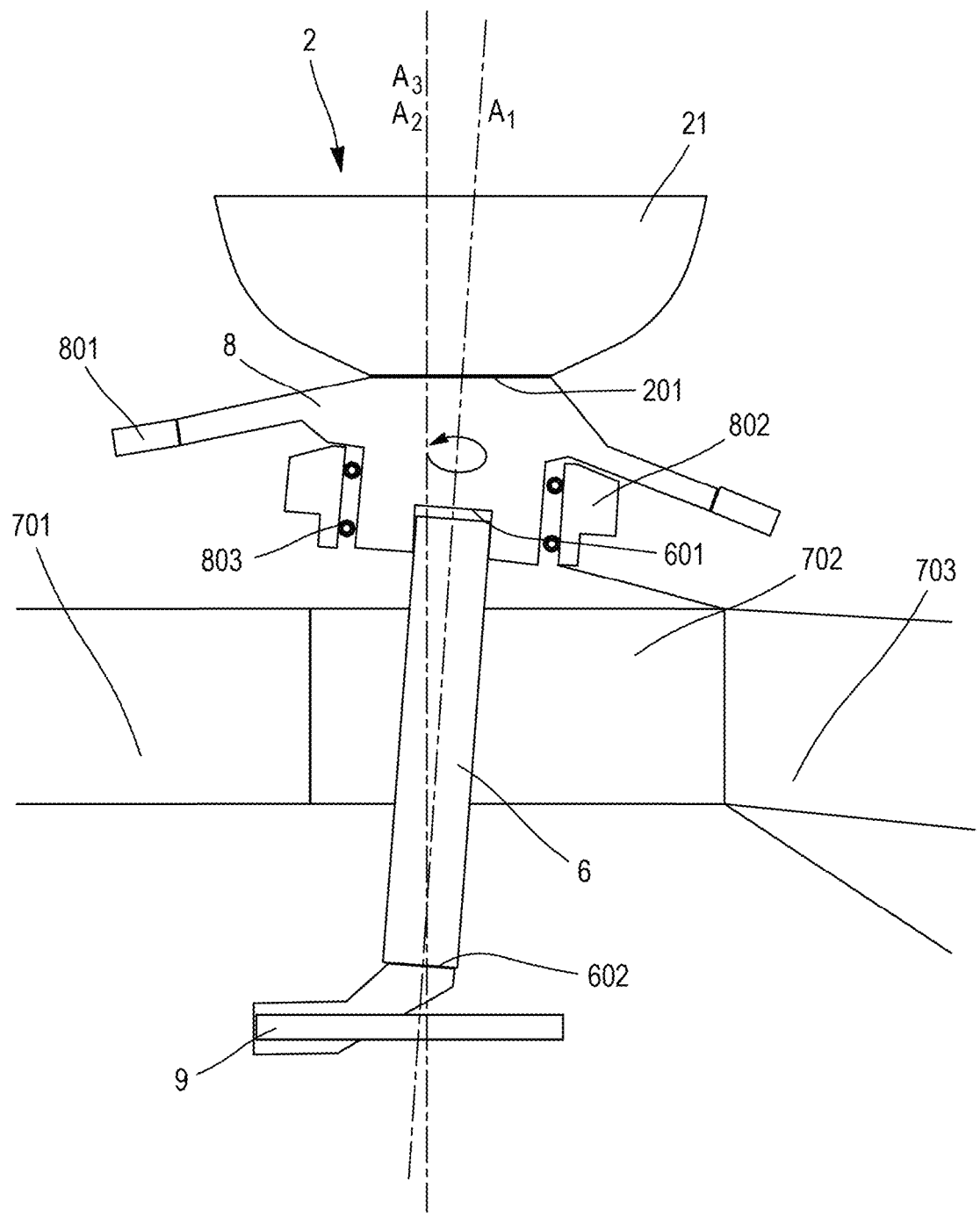
Figure 11:
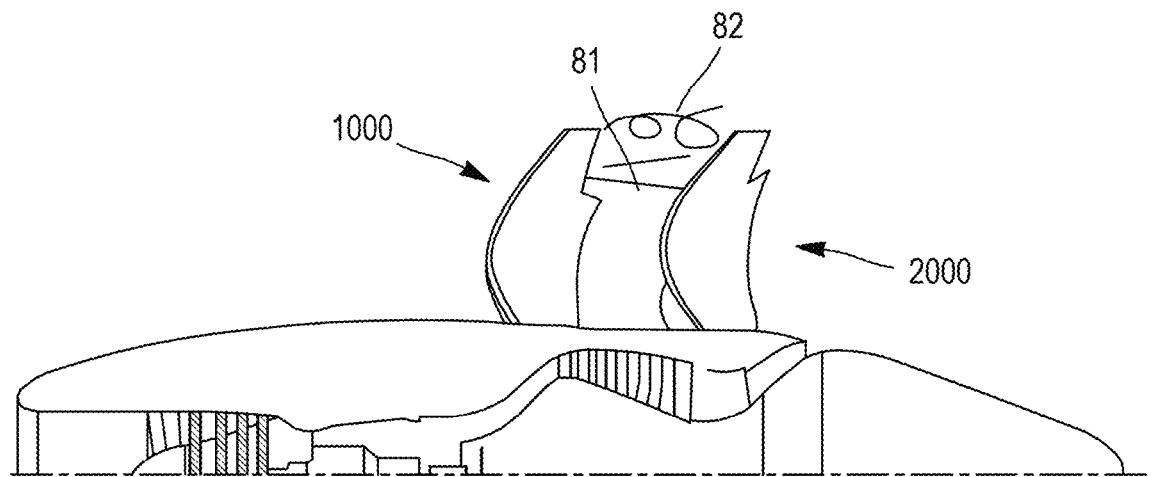
Figure 12:
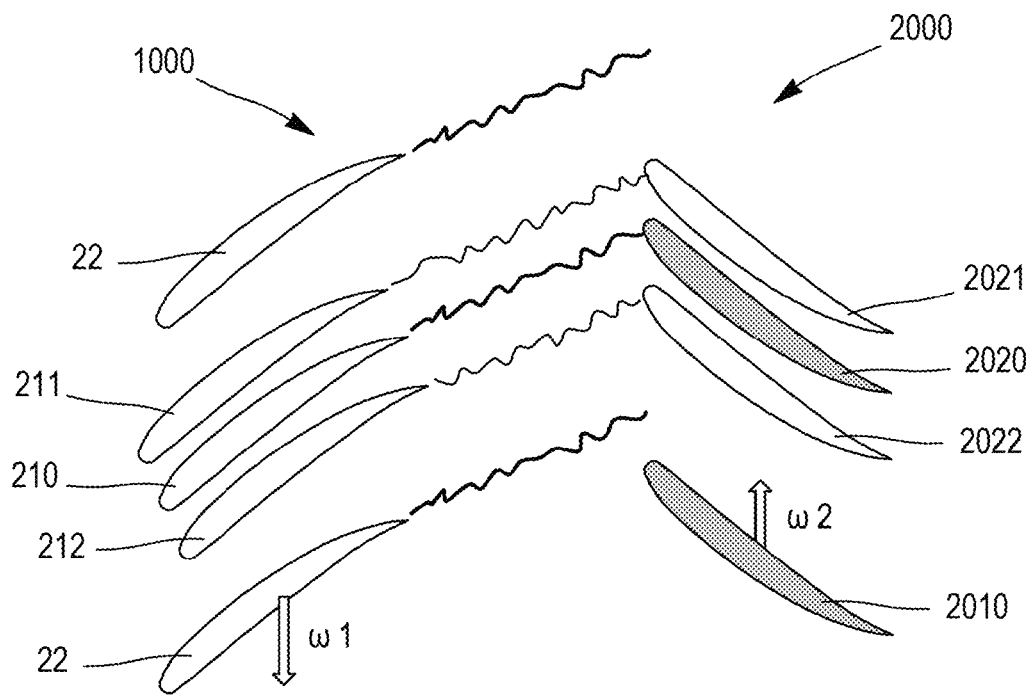
Figure 13A:
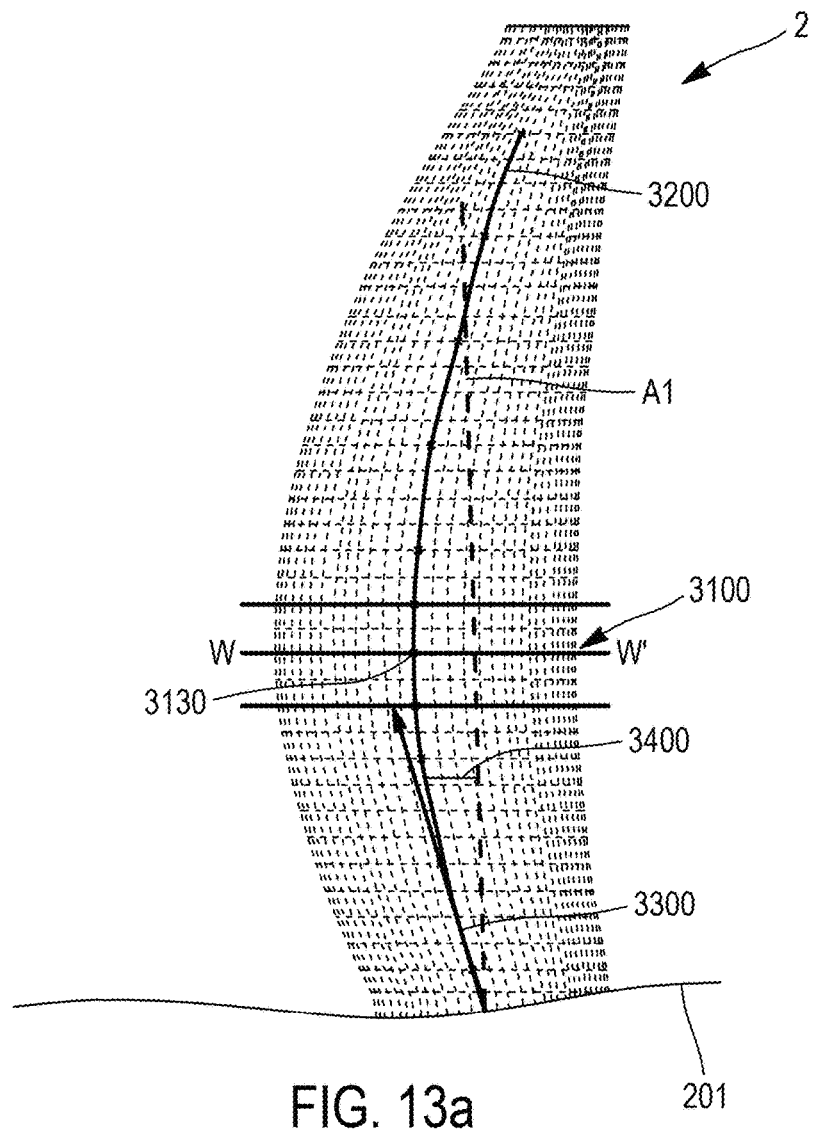

FIG. 4 schematically illustrates the specific lines of the acoustic radiation of a bladed wheel according to the prior art with respect to the bladed wheel of FIG. 3d;

FIG. 5 illustrates a detail of a bladed wheel comprising a connecting shaft tilted according to another further exemplary embodiment of the invention;

FIG. 6 illustrates a detail of a bladed wheel comprising bellows according to another further exemplary embodiment of the invention;

FIG. 7 illustrates a detail of a bladed wheel comprising a universal joint according to another further exemplary embodiment of the invention;

FIG. 8 illustrates a detail of a second blade of a bladed wheel according to an exemplary embodiment of the invention;

FIG. 9 illustrates a detail of a bladed wheel comprising a blade tilt according to another further exemplary embodiment of the invention;

FIG. 10 illustrates a detail of a bladed wheel comprising a tilt of to the axis of rotation and a blade tilt according to another further exemplary embodiment of the invention;

FIG. 11 is a partial illustration of a turbine engine with contra rotative bladings indicating sources of interaction noise between the bladings;

FIG. 12 schematically illustrates bladed wheels according to the prior art and according to exemplary embodiment of the invention;

FIG. 13a schematically illustrates a blade seen as a profile; and

Figure 13B:
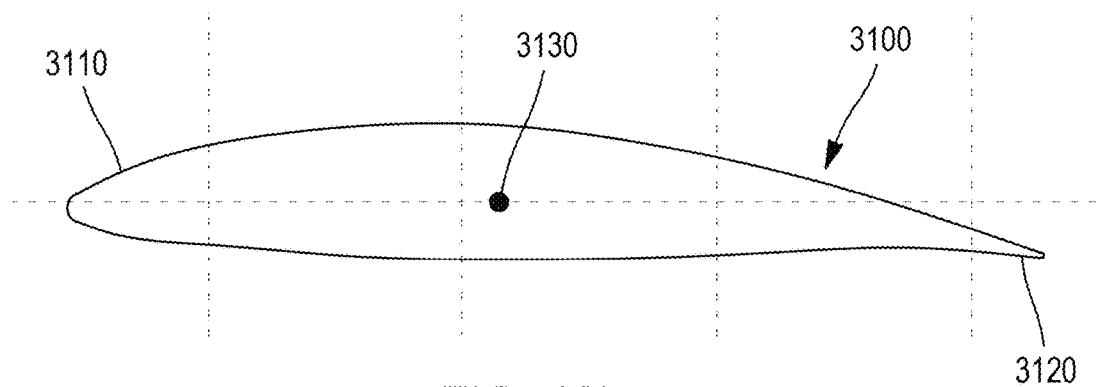

FIG. 13b schematically illustrates a sectional view of a section of the blade of FIG. 13a.

DETAILED DESCRIPTION OF THE INVENTION

Turbine Engine

Figure 1:
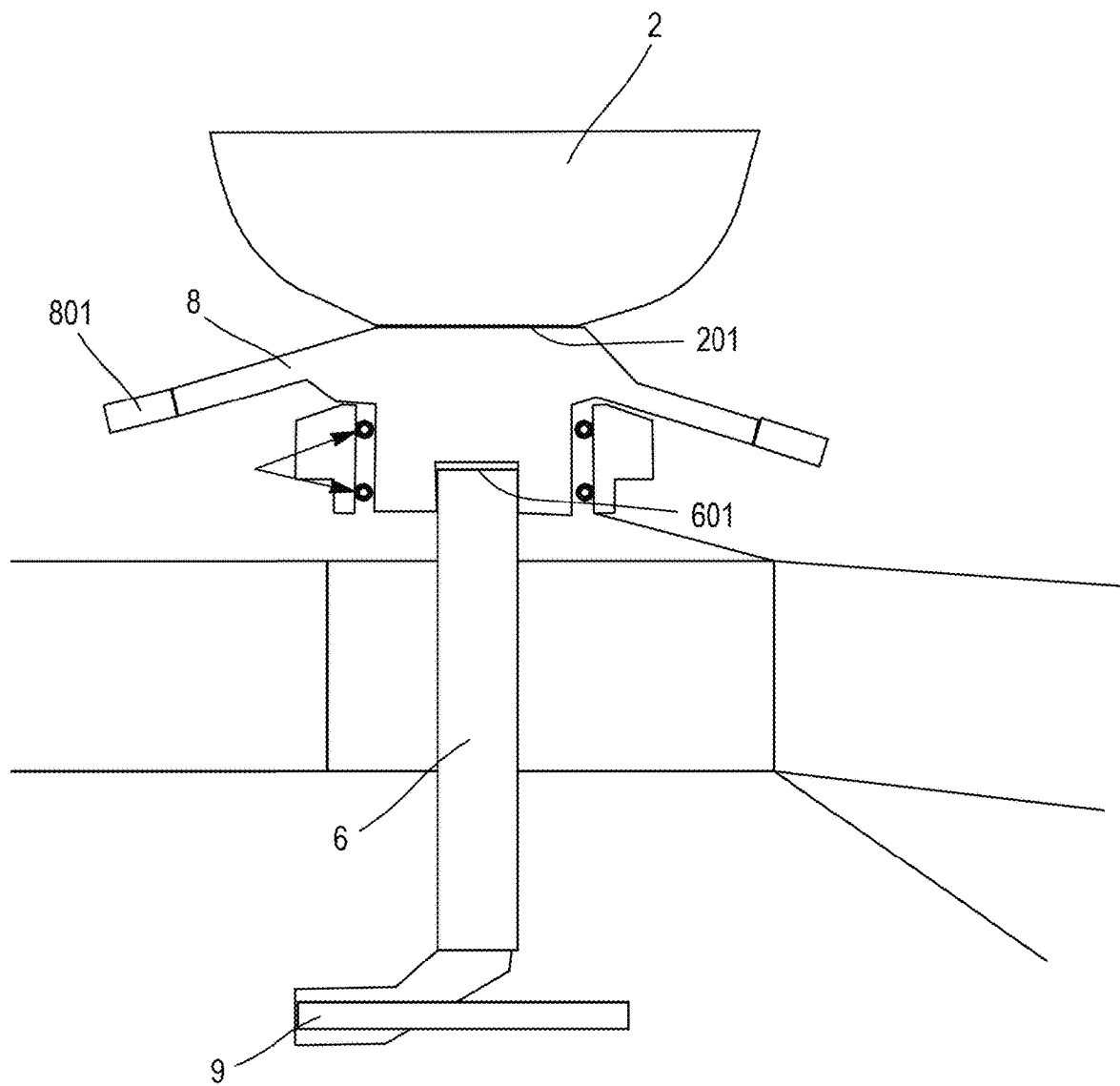
FIG. 1 is a partial illustration of a bladed wheel of the prior art.
Figure 2:
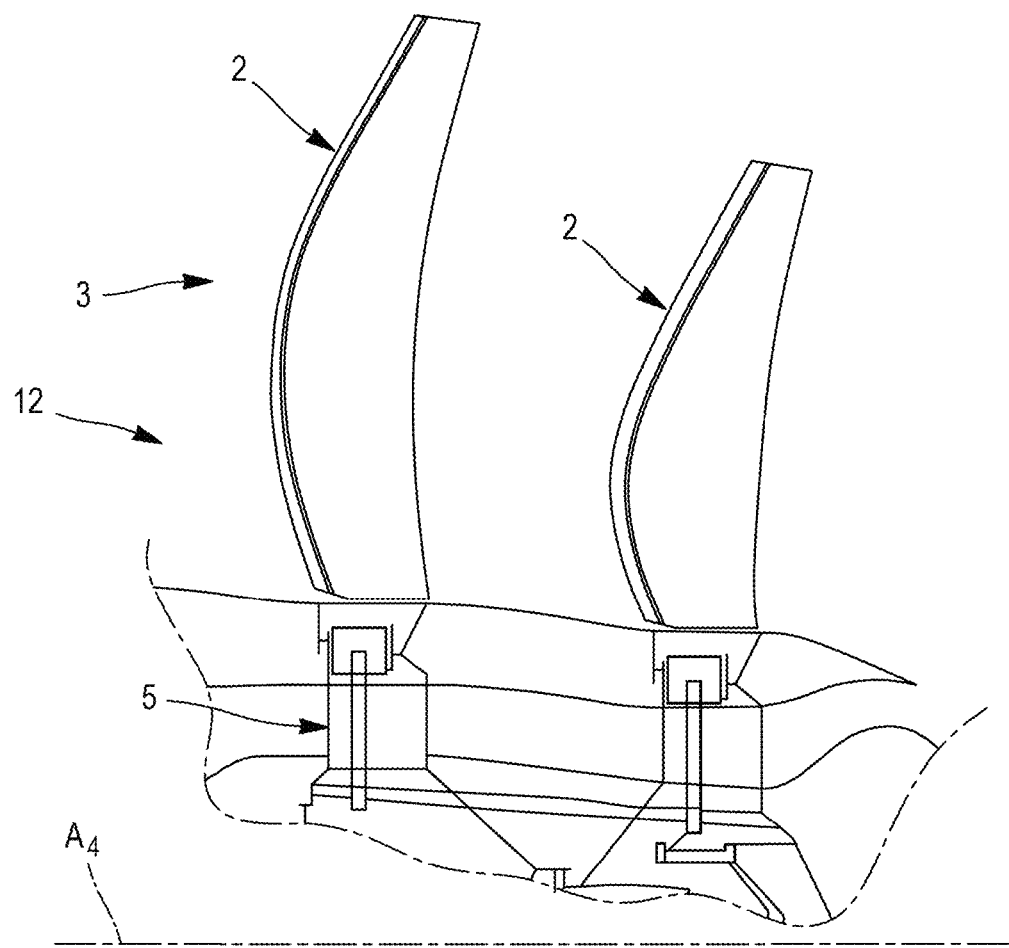
FIG. 2 is a partial illustration of a turbine engine on which the bladed wheel is able to be integrated.

With reference to FIG. 2, a turbine engine portion 12 is illustrated. The turbine engine 12 is typically a turboprop.

The turbine engine 12 typically comprising a fan 3, in which the vanes or blades 2 belong to at least one bladed wheel, for example a simple propeller (not shown) or two propellers, typically two contra rotative propellers.

By bladed wheel, is meant for example a set of blades, distributed over a same ring, the ring extending around the engine axis.

The blades are for example distributed in a regular way in azimuth, for example with a tangential spacing of $2\pi/N_{blades}$ radians wherein $N_{blades}$ is the number of blades of the bladed wheel.

In the case of an engine with a simple propeller, the propelling system consists of a single propeller.

In the case of an engine with several wheels, this is for example a turbine engine of the "open rotor" or "unducted fan" type, typically such a turbine engine with contra rotative bladings.

Conventionally, an air flow at a high pressure and temperature with respect to the external flow to the engine gives the possibility of driving into rotation the rotor 5.

The rotor 5 then has a movement of rotation around a longitudinal axis Put of the fan 3, which is transmitted to the blades 2 of the simple wheel or of the wheels, for their setting into rotation around a longitudinal axis $A_4$.

Blading

Variable Pitch

With reference to FIGS. 5 to 10, bladed wheels 1 comprising blades 2 according to the invention are described.

As stated earlier, the geometrical pitch is for example the angle formed by the cord of the profile of a blade 2 and the plane of rotation of the corresponding propeller 4. Subsequently, only the term "pitch" will be used, as this is currently used in the state of the art.

It is noted that the pitch is an algebraic value. For example, a −90° pitch corresponds to a pitch for which the leading edge of the blade 2 is located rearwards.

The pitch of the blades 2 of the bladed wheel or of the propeller is adapted according to the flight conditions: for example, on the ground, the pitch is close to 10°, upon take—off, between 35° and 45°, and upon ascent, between 45° and 60°. During cruising, the pitch is close to 65°.

The 90° pitch is conventionally designated as a "feather" position by one skilled in the art, the 0° pitch, a "flat" position, and the −30° pitch, the "reverse" position (this position gives the possibility of breaking the aircraft).

The bladed wheel 1 comprises a plurality of blades 2 of the bladed wheel or propeller blades. Each blade 2 is with variable pitch along a blade rotation axis $A_1$. Each blade 2 has a root 201.

The plurality of blades 2 comprises at least one first blade 21 and at least one second blade 22. The plurality of blades 2 thus comprises one or several first blades 21 and one or several second blades 22.

The bladed wheel 1 comprises a plurality of shafts 6 for connection to the rotor. Each connecting shaft 6 is typically adapted so that its rotation modifies the pitch of one of the blades 2. Each connecting shaft 6 has a foot 602 and a head 601. The shafts 6 are for example positioned at a rotating case arm 702, between a vein coming from the turbine 701 and a vein directed towards the nozzle 703.

The root 201 of each blade 2 is typically mounted on the head 601 of a rotor connecting shaft 6.

Conventionally, each blade 2 is bound to the corresponding connecting shaft 6 through a dedicated pivot 8 so as to allow the rotation of each blade 2 along the blade 2 axis of rotation $A_1$. The root 201 of each blade 2 is for example mounted on the head 601 of a rotor connecting shaft 6 via the pivot 8. The pivot 8 may comprise counterweights 801. Thus the root 201 of the blade 2 may be housed in the pivot 8. The pivots 8 are for example mounted in an axisymmetrical ring 802 having a plurality of substantially cylindrical radial housings, this ring 802 being currently designated as a polygonal ring. Roller bearings 803 positioned between the polygonal ring 802 and the pivot 8 give the possibility of retaining a degree of rotary freedom of the pivot 8 with respect to the polygonal ring 802.

The bladed wheel may further comprise parts able to be displaced together along an axial direction so as to drive into rotation the connecting shaft 6. The parts generally comprise a connecting rod 9, one end of which is connected to the connecting shaft 6. Each connecting rod 9 is connected to a connecting shaft 6 of a blade 2.

The device 1 may further comprise at least one actuator (not shown) controlling the displacement of the connecting rod 9 along the axial direction.

The pitch of the blade 2 may be modified by axial extension of the rod of the actuator, which acts on the connecting rod 9 in an axial translation.

Tilt of the Axis of Rotation

The first blade 21 has a first tilt of the axis of rotation, such that its blade rotation axis $A_1$ is tilted in a fixed way with respect to a radial axis $A_2$, the radial axis $A_2$ passing through the foot 602 of the corresponding shaft 6, i.e. the shaft 6 is adapted so that its rotation modifies the pitch of the first blade 21. The first tilt of the axis of rotation is non zero because of its tilt with respect to the radial axis $A_2$.

The second blade 22 has a second tilt of the axis of rotation, typically with respect to the radial axis $A_2$, which is different from the first tilt of the axis of rotation. The axis of rotation of the second blade 22 is typically tilted in a fixed way with respect to the corresponding radial axis $A_2$.

Thus, the second tilt of the axis of rotation may be such that the corresponding blade rotation axis $A_1$ has zero tilt, i.e. its blade rotation axis $A_1$, is not tilted with respect to the radial axis $A_2$ passing through the foot 602 of the corresponding shaft 6, i.e. the shaft 6 is adapted so that its rotation modifies the pitch of the second blade 22, the second blade 22 being mounted so that its lack of tilt is maintained.

Alternatively, the second blade 22 may be mounted so as to have a blade rotation axis $A_1$ tilted in a fixed way with respect to the radial axis $A_2$ passing through the foot 602 of the corresponding shaft 6, i.e. the shaft 6 is adapted so that its rotation modifies the pitch of the second blade 22, the second tilt of the axis of rotation being however broken down into components having values different from those of the first tilt of the axis of rotation, i.e. that at least one of the components does not have the same value for the tilt of the axis of rotation of the first blade and for the tilt of the axis of rotation of the second blade.

A tangential tilt component and/or a tilt component towards the upstream side or towards the downstream side with respect to the plane of the propeller is thus typically different from the corresponding component of the first tilt of the axis of rotation. The result of this is an untuning between said at least one first blade 21 and said at least one second is blade 22 for at least one pitch. By untuning, is meant that the blades of a same bladed wheel, are no longer governed by cyclic symmetry by rotation by a constant angle around the engine axis. By constant angle around the engine axis, is meant an angle equal to 360/N degrees wherein N represents the number of blades of the wheel.

Such a bladed wheel gives the possibility of reducing the effective perceived noise produced by the operating turbine engine.

Indeed, the global noise produced by an airplane during operation comprises a first tone component, generated by the rotating portions of the airplane and/or by mechanisms for generating a vortex, and a second wide band component mainly generated by the interaction of turbulent structures with the bearing surfaces of the airplane.

As indicated earlier, the acoustic certification of an airplane is based on the EPNL criterion, which is representative of the noise levels of the airplane in the approach and take—off phases. The EPNL also takes into account the discomfort perceived by the human ear, and caused by the different components, the tone component and the wide band component, of the measured noise spectra.

The emergence of the acoustic levels of lines of the first tone component with respect to the noise level of the second wide band component causes strong discomfort perceived by the human ear. Such an emergence is therefore a strong penalty during the evaluation of the EPNL criterion.

The specific noise of a propeller for example radiates at rotation frequencies which are multiples of the speed of rotation and of the number of blades uniformly distributed over the bladed wheel. Such frequencies are thus of the form k.ω.N, wherein k is an integer, w the speed of rotation, for example expressed in Hertz or in revolutions/s, and N the number of uniformly distributed blades. Such frequencies are called blade passing frequencies (BPF).

Thus, for the $i^{th}$ bladed wheel comprising $N_i$ blades and rotating at a rotation condition in turns/min $RPM_i$, a blade passing frequency of the $i^{th}$ $BPF_i$ wheel is obtained by a formula of the type:

$$BPF_i = N_i * RPM_i / 60$$

When all the blades are distributed uniformly over the bladed wheel or propeller, like in existing engines, the specific noise of the propeller may thus consist of the fundamental line at the frequency $BPF_i$ and of its harmonics.

Thus, the acoustic contributions of each blade, over the total specific noise of the bladed wheel, are added in amplitude and in phase and the amplitude of the radiated specific noise is mainly proportional to the global load of the bladed wheel and of the displaced fluid volume. Each blade thus contributes for example to a fraction of the global traction according to a formula of the type:

$$T_j = T / N_j$$

wherein $T_j$ is the traction generated by the $j^{th}$ blade, T is the global traction and $N_i$ is the number of blades of the $i^{th}$ bladed wheel.

When the blades are uniformly distributed in azimuth on the propeller, the radiated acoustic energy is localized at the frequencies n*BPFi of the rotation.

The bladed wheel according to the invention has a modified periodicity because of the tilt of the axis of rotation of the first blade 21 or of the first blades 21 which is different from the tilt of the axis of rotation of the second blade 22 or of the second blades 22, so as to distribute for a given pitch the acoustic energy making up the specific noise over several distinct frequencies and to obtain untuning in frequency.

By considering for example loads distributed in the same way between each of the blades, the described heterogeneous bladed wheel, which has a modified bladed wheel periodicity from one blade to the other for at least one pitch, because of the tilt of the axis of rotation, preferentially tangentially in azimuth, alternatively or additionally towards is the upstream side or towards the downstream side with respect to the plane of the propeller, contributes to distributing the acoustic energy making up the specific noise over several distinct frequencies. The upstream and downstream sides are typically defined with respect to the upstream side and to the downstream side of the engine.

The invention thus allows reduction in the emergence of lines of the specific propeller noise with respect to the wide band level, and therefore reduction in the calculated EPNL levels as well as the perceived discomfort.

As illustrated in FIG. 3a, the first tilt of the axis of rotation may comprise a tangential tilt component β in the plane of the bladed wheel, i.e. such a non-zero component. The tangential direction is typically defined by the plane of rotation around the engine shaft.

Alternatively or additionally, as illustrated in FIGS. 5, 6 and 7, the first tilt of the axis of rotation may comprise a tilt component towards the upstream side or towards the downstream side a with respect to the plane of the bladed wheel, i.e. such a non-zero axial component.

By plane of the bladed wheel or plane of the propeller, is meant for example the plane orthogonal to the axis of the turbine engine at which is positioned the bladed wheel. The plane of the bladed wheel is thus for example the plane in which substantially extends the bladed wheel. This is then the plane orthogonal to the engine axis and in which is located the center of gravity of the bladed wheel.

By convention, α will be considered as positive for an upstream—downstream tilt towards the upstream side and β will be considered positive for a tangential tilt in the direction defined by the rotation of the propeller, typically around the engine shaft, i.e. towards the intrados.

In the same way, the second tilt of the axis of rotation may comprise a tangential tilt component β in the plane of the propeller, i.e. such a non-zero component, and/or a tilt component α towards the upstream side or towards the downstream side with respect to the plane of the propeller, i.e. is such a non-zero component.

Alternatively, as indicated earlier, the second tilt of the axis of rotation may comprise a zero tangential tilt in the plane of the propeller, and/or a zero tilt towards the upstream side or towards the downstream side with respect to the plane of the propeller as illustrated in FIG. 8.

The blade rotation axis $A_1$ of the first blade 21, optionally of the second blade 22, is typically tilted in a fixed way with respect to the corresponding radial axis $A_2$. The tangential tilt component β and/or the α tilt component towards the upstream side or towards the downstream side of the first tilt of the axis of rotation, optionally of the second tilt of the axis of rotation, may be fixed with respect to the radial axis $A_2$.

In other words, the tilt of the axis of rotation of the first blade 21, optionally of the second blade 22, may be set with respect to the radial axis $A_2$ so as to only allow, during the operation of the blading, a rotation of the first blade 21, optionally of the second blade 22, along the corresponding blade rotation axis $A_1$, the axis of rotation $A_1$ being thus tilted tangentially and/or towards the upstream side or towards the downstream side in a fixed way with respect to the corresponding radial axis $A_2$. Thus, the blade 2 only has one degree of freedom in rotation, typically a degree of freedom in rotation along a single axis, that along the axis of rotation $A_1$, no rotation along other axes of rotation being possible.

The tangential tilt component β and/or the α tilt component towards the upstream side or towards the downstream side, in other words the tangential tilt angle and the tilt angle towards the upstream side or towards the downstream side are for example determined during the design, and may therefore be set by the building of the bladed wheel.

Thus, during the design process, the combination of the α tilt component towards the upstream side and the β tangential tilt component is determined for meeting determined aero-acoustic and mechanical goals.

This combination of a tilt component towards the upstream side a and of the tangential tilt component β, i.e. this combination of angles, is then for example applied to the roller bearings 803. The only remaining degree of freedom is then the angle of rotation of the blade 2, for example of the first blade 21 and/or of the second blade 22, around the axis which is defined by the roll (and which is controlled by the control for changing pitch via the radial shaft). The angles α and β are for example set at the manufacturing of the ring 802. As illustrated in FIG. 5, each connecting shaft 6 corresponding to a first blade 21, optionally to a second blade 22, may be tilted with respect to the radial axis $A_2$, thereby tilting the first blade 21, optionally the second blade 22, corresponding according to the desired tilt of the axis of rotation. Such an application is particularly suitable for tilt for which the tangential components and towards the upstream or downstream side do not exceed 5° in absolute value.

The tilt of the connecting shaft 6 corresponding to the ant first blade 21, optionally to the second blade 22, is for example a set tilt with respect to the corresponding radial axis $A_2$, typically at a tilt comprising a tangential component β and/or the tilt component towards the upstream or towards the downstream side a fixed with respect to the radial axis $A_2$.

Alternatively, or additionally, each connecting shaft 6 of the rotor corresponding to the first blade 21, optionally to a second blade 22, may have a joint tilting the head 602 of the connecting shaft with respect to the remainder of the shaft 6, and thus tilting the first blade 21, optionally the second corresponding blade 22, according to the desired tilt of the axis of rotation.

The joint may maintain the head 602 of the shaft according to a tilt fixed with respect to the radial axis $A_2$, typically a tilt comprising a tangential component β and/or the tilt component a towards the upstream side or towards the downstream side which is fixed with respect to the radial axis $A_2$.

With reference to FIG. 6, such a joint may comprise bellows 10, for example metal bellows. Such bellows 10 are adapted for applying a first tilt of the axis of rotation, optionally a second tilt of the axis of rotation, the components of which may have values of several degrees.

With reference to FIG. 7, such a joint may comprise a universal joint 11. Such a universal joint 11 is suitable for applying a first tilt of the axis of rotation, optionally a second tilt of the axis of rotation, the components of which may have values of several tens of degrees.

The first blade and the second blade for example have the same geometrical shape. Thus, the tilt difference of the axis of rotation between the first blade 21 or the first blades 21 and the second blade 22 or the second blades 22 gives the possibility of reducing the noise produced by the bladed wheel while having the same geometrical shape for all the blades. The result of this is more easy dimensioning since it is not necessary to produce the bladed wheel with two types of different blades, and therefore a reduction in the development and production costs of the bladed wheel.

The mechanical performances may also be improved by a first and/or second tilt of the axis of rotation comprising a tilt component towards the upstream side or towards the downstream side a with respect to the plane of the propeller.

Moreover, the bladings are caused to operate under various aerodynamic conditions according to the flight points such that the take— off, the ascent or the cruising. It is known that these different flight points imply different geometries of a bladed wheel by variation of the pitch.

The variation of pitch by rotation of the blades 2 according to the to prior art limits the possibilities of compromise on a geometry of the bladed wheel adapted for the different flight points.

The introduction of a first tilt of the axis of rotation, and optionally of a second tilt of the axis of rotation, also allows improvement in the aerodynamic performances of the bladed wheel. The first and/or second tilt of the axis of rotation allows improvement in the pitch variations between the root 201 of the blade and a head of the blade 2 and thus possible re-adaptation of the tilt of the flow on the profiles over the relevant span of the blade.

One skilled in the art will understand that by a different tilt of the axis of rotation, is meant a difference going beyond the uncertainties specific to this type of technical manufacturing. On the contrary, two tilts of the axis of rotation having differences in the order of magnitude of these uncertainties are considered by one skilled in the part as being identical, and cannot obtain the technical effects discussed herein before.

The difference in absolute value between the first tilt of the axis of rotation and the second tilt of the axis of rotation is for example of the order of one degree, for example greater than or equal to 1°, for example greater than or equal to 2°, for example greater than or equal to 4°, for example greater than or equal to 5°.

Blade Tilt with Respect to the Axis of Rotation

Each blade of the bladed wheel may have a fixed position with respect to the blade rotation axis $A_1$ of the relevant blade in the rotating reference system of the relevant blade. This position for example corresponds to a tilt which may be zero or non-zero.

All the blades may thus be tilted in a fixed way with respect to their respective axes of rotations according to respective blade tilts.

By blade tilt, is typically meant the angle in an algebraic value, formed between the axis of stacking of the relevant blade and the axis of rotation of the relevant blade. Each blade is for example formed with a plurality of blade sections stacked so as to form said blade. Each section for example extends between a leading edge and a trailing edge. The stacking axis may thus be defined as the axis passing through the centers of gravity of the blade sections forming the relevant blade.

If the centers of gravity cannot be connected through a straight line, the stacking axis may be a stacking curve. This stacking curve has a tangent at the end located at the root of the blade, which thus corresponds to the intersection of the stacking curve and of a hub of the nacelle of the turbine engine. The blade tilt may then be defined as the angle in an algebraic value, formed between said tangent of the relevant blade and the axis of rotation of the relevant blade.

The blade tilts of the first blade 21 and of the second blade 22 may be identical, for example zero or non—zero. In this case, if the first blade 21 and the second blade 22 have identical shapes and different tilts of the axis of rotation, regardless of the pitch, the bladed wheel exhibits untuning.

Alternatively or additionally to the difference of tilt of the axis of rotation between the first blade 21 and the second blade 22, the first blade 21 may have a first blade tilt, such that the first blade 21 is tilted in a fixed way with respect to the blade rotation axis $A_1$ of the first blade 21, and the second blade 22 may exhibit a second blade tilt different from the first blade tilt.

The result of this is an untuning between said at least one first blade 21 and said at least one second blade 22 for at least one pitch. By untuning, is meant that the blades of a same bladed wheel, are no longer governed by a symmetry by rotation of a constant angle around the engine axis.

In the same way as for the untuning obtained by difference of tilt of the axis of rotation as described herein before, such a bladed wheel gives the possibility of reducing the effective perceived noise produced by the operating turbine engine.

Indeed, the bladed wheel according to the invention has a periodicity modified because of the blade tilt of the first blade 21 or of the first blades 21 which is different from the blade tilt of the second blade 22 is or of the second blades 22, so as to distribute for a given pitch, the acoustic energy making up the specific noise on several distinct frequencies and to obtain untuning For example by considering the loads distributed in the same way between each of the blades, the described heterogeneous bladed wheel which has a modified periodicity of a bladed wheel from one blade to the other for at least one pitch, because of the tilt of the blade axis for at least one pitch, contributes to distributing the acoustic energy making up the specific noise over several distinct frequencies.

The invention thus gives the possibility of reducing the emergence of the lines of the specific propeller noise with respect to a wide band level, and therefore of reducing the calculated EPNL levels as well as the perceived discomfort.

As illustrated in FIG. 3b, the first blade axis tilt, i.e. the tilt of the cord $A_3$ of the profile of the blade with respect to the axis of rotation $A_1$ may comprise a tangential tilt component in the plane of the bladed wheel for a given pitch, i.e. such a non—zero component. Depending on the time-dependent change in the pitch, i.e. of the rotation of the blade with respect to its axis of rotation, this component may alternatively be tangential, towards the upstream side or towards the downstream side. FIG. 9 thus illustrates for example a first blade 21, for which the cord $A_3$ is tilted with respect to the axis of rotation $A_1$, thus tilting the first blade 21 according to the desired blade tilt.

By rotating reference system of a blade, is meant the reference system bound to the blade and in which this blade is therefore fixed.

One skilled in the art will understand that by different blade tilt is meant a difference going beyond specific uncertainties of this type of technical manufacturing. On the contrary, two blade tilts having differences of the order of magnitude of these uncertainties are considered by one skilled in the art as being identical, and cannot obtain the technical effects discussed herein before.

The difference in absolute value between the first blade tilt and the second blade tilt is for example of the order of one degree, for example greater than or equal to 1°, for example greater than or equal to 2°, for example greater than or equal to 4°, for example greater than or equal to 5°.

The representation of a blade in the form of a plurality of stacked blade sections is a standard representation for one skilled in the art. Also, it is standard for one skilled in the art, from such a representation, to determine the center of gravity of a blade section, which depends in a standard way on the distribution of the constitutive material(s) of the section and of the shape of the relevant section. Alternatively, the computed center of gravity may be a center of gravity in the geometrical sense of the term, i.e. that the distribution of the material(s) is not taken into account and that the center is computed on the only basis of the relevant section shape, as if a single material was distributed in a homogenous way.

With reference to FIG. 13a, a blade 2 schematically illustrated as a profile view is described. The blade 2 is formed with a plurality of blade sections. FIG. 13b schematically illustrates a sectional view of a section 3100 of the blade of FIG. 13a along the plane W—W'. The section 3100 extends between a leading edge 3110 and a trailing edge 3120 and has a center of gravity 3130, which here corresponds both with the geometrical center of gravity and with the center of gravity in the mechanical sense in the case of a blade in a homogeneous material. The stacking curve 3200 thus corresponds to the curve passing through the centers of gravity of the blade sections forming the relevant blade. The blade tilt 3400 may then be evaluated by considering the tilt of the tangent 3300 to the curve located at the root 201 of the blade 2 with respect to the axis of rotation of the blade $A_1$.

The angle in an algebraic value may be expressed according to the is methods conventionally used by one skilled in the art. The tilt may be broken down into three rotations by the method of the Euler angles, each rotation being expressed by an algebraic value. Choice of the sign for the algebraic value may be made according to any convention known to one skilled in the art.

Tilt of the Axis of Rotation and Blade Tilt

The first blade 21 and the second blade 22 may be configured so that their respective pitches along the axis of rotation are modified simultaneously.

The first blade and the second blade may be configured for exhibiting different tilts of the axis of rotation and different blade tilts. Such a combination of the two differences in tilt allows more accurate dimensioning of the bladed wheel according to the untuning to be obtained.

In particular, the first blade and the second blade may be configured for having different tilts of the axis of rotation and different blade tilts so that in a first pitch position, for example when the bladed wheel is blocked in a high speed position, the first blade and the second blade each have the same position with respect to the corresponding radial axes, and so that in a second pitch position, for example a low speed position, the first blade and the second blade have different positions with respect to the corresponding radial axes.

Thus it is possible, by retaining the same geometrical shape of the blade 2, to obtain a blading for which the noise during the operation upon take—off and on landing is reduced while retaining its efficiency in operation at a high altitude for which the positioning of the blades within the bladed wheel will be unchanged with respect to the standard configuration with blades having an axis of change in radial pitch, i.e. reproducing the configuration of the tuned cyclic symmetry.

This is of particular interest since the differences in tilt of the axis of is rotation and/or of the blade between the first blade 21 and the second blade 22 may cause particularly pronounced deviations at the blade head 2, i.e. specifically in the area where the blades are the most loaded in a low speed flight condition and wherein the acoustic sources are the most intense.

Actually, in this way, at a high speed, the blades have the same spatial position around the bladed wheel, in particular as regards the portion of the blade useful during high altitude flight, but for the low speed operating points, relevant for the acoustics, for which the blades 2 have to be realigned, typically of the order of 25°, the modification of the pitch, although simultaneous for the first blade 21 and the second blade 22, typically by a single command, gives the possibility of obtaining spatial positions between the first blade 21 and the second blade 22 within the bladed wheel.

According to an example, the second blade has zero tilt of the axis of rotation and a zero blade tilt, the first blade having a non—zero tilt of the axis of rotation, typically towards the downstream side, and an also non— zero blade tilt, typically towards the downstream side in the low speed pitch position, so that the first blade is tuned with the second blade in the low speed pitch position and untuned in a high speed pitch position.

FIG. 10 thus illustrates an example of a first blade 21 in a high speed pitch position, for which the cord $A_3$ is then not tilted with respect to the radial axis $A_2$, so as to be tuned with a second blade 22 according to FIG. 8, but for which the axis of rotation $A_1$ is however tilted. Thus, the modification of the pitch position along the tilted axis of rotation $A_1$ allows modification of the tilt of the cord $A_3$ of the first blade 21 with respect to the second blade 22 and therefore obtaining an untuned low speed position with respect to the second blade 22 according to FIG. 8.

Distribution of Said at Least One First Blade and of Said at Least One Second Blade As indicated above, said at least one first blade 21 typically comprises one or several first blades 21 and said at least one second blade 22 comprises typically one or several second blades 22, which are differentiated by their tilt of the axis of rotation and/or their blade tilt as described herein before for at least one pitch.

The bladed wheel may comprise at least one third blade, typically one or several third blades, typically tilted in a fixed way so as to have a third tilt of the axis of rotation or of the blade axis which is different from the first tilt and from the second tilt.

Thus, the bladed wheel may comprise several other sets of blades each having a different tilt from that of the other sets of thereby defined blades.

The first blades 21 and the second blades 22 may be placed along the bladed wheel according to an untuned spatial organization as described above, giving the possibility of compensating for the dissymmetry of the resulting forces and therefore preventing imbalance problems.

Such a correction may for example comprise a periodic organization per sectors of the first blades 21 and optionally of the second blades 22 so as to compensate for the variation of the forces on the untuned blades, i.e. the first blades 21, with respect to the standard blades, typically the second blades 22.

The blades 2 may be distributed uniformly with respect to each other at the periphery of the bladed wheel.

The first blades 21 may be distributed uniformly with respect to each other at the periphery of the bladed wheel.

With reference to FIG. 3c, a bladed wheel is described as described earlier, for example comprising twelve blades 2, for which a portion, for example a quarter, of the blades of the plurality of blades 2 are first blades 21 which have a first tilt of the axis of rotation and/or a first blade tilt as described earlier, the first tilt being different from the second tilt of a is portion of the other blades, for example of all the other blades, for example the three quarters of the blades of the plurality of blades 2, these other blades being second blades 22.

The feet of the shafts of all the blades of the plurality of blade 2 are for example distributed uniformly along the bladed wheel. The feet of the shafts of al the first blades of the plurality of blades 2 are for example distributed uniformly around the engine axis. The first blades 21 and the second blades 22 for example have identical geometrical shapes, the difference between the first blades 21 and the second blades 22 resulting from the different tilt of their axis of rotation $A_1$ with respect to the corresponding radial axis $A_2$ of each of the blades.

With reference to FIG. 3d, a bladed wheel is described, as described earlier, comprising for example twelve blades 2, for which one portion, for example a third, of the blades of the plurality of blades 2 are first blades 21 which have a first tilt of the axis of rotation and/or a first blade tilt as described earlier, this first tilt being different from the second tilt of a portion of the other blades, for example of all the other blades, for example of the two thirds of the blades of the plurality of blades 2, these other blades being second blades 22.

With reference to FIG. 4, a diagram is described representing the sound intensity (dB in ordinates) versus the blade passing frequency BPF in the case of a bladed wheel according to the prior art as compared with the case of a bladed wheel according to the invention, in particular a bladed wheel according to FIG. 3d.

It is noted that the distinction of the blades 2 of the bladed wheel between the first blades 21 and the second blades 22 gives the possibility to of reducing the perceived noise level. Indeed, in the prior art, all the identical blades positioned uniformly participate in forming a tone component 420. With a bladed wheel according to the invention, as the one described in FIG. 3d, the tone component 420 is replaced, for at least one pitch, with several distinct tone components of lower levels, typically a is first tone component 421 for the first blades 21 which have a first tilt as described earlier and a second tone component 422 for the second blades 22 having a second tilt as described earlier, typically a second zero tilt. The result of this is a reduction in the perceived noise in the calculation of EPNL.

The periodicity of the blades 2 along the bladed wheel having been modified, the acoustic signature of the fundamental line will no longer be localized on one frequency but at least on two.

The amplitude of each line of the untuned bladed wheel also tends to decrease since the specific noise being proportional to the load of the blading, the load of the blades signing on each distinct frequency decreases.

This mechanism therefore gives the possibility, by applying it in a relevant way for generating the heterogeneity of the bladed wheel, of decreasing the value of the EPNL criterion, used for the acoustic certification of airplanes in a take—off and landing phase.

Associated Turbine Engine

The turbine engine may thus comprise such a bladed wheel with variable pitch. The turbine engine may in particular comprise two of such bladed wheels with variable pitch, the bladed wheels being for example contra rotative bladed wheels.

Turbine Engine with Two Bladed Wheels

Arrangement of the First Bladed Wheel and of the Second Bladed Wheel

The turbine engine may comprise a first bladed wheel 1000 as described earlier.

With reference to FIG. 11, the turbine engine may further comprise a second bladed wheel 2000. The second bladed wheel 2000 typically comprises a plurality of blades 2002. The first bladed wheel 1000 may be is positioned on the upstream side or on the downstream side of the second bladed wheel 2000 along the axis of the turbine engine.

The first bladed wheel 1000 and the second bladed wheel 2000 typically have different speeds and/or directions of rotation. The first bladed wheel 1000 and the second bladed wheel 2000 are typically contra rotative.

The first bladed wheel 1000 and the second bladed wheel 2000 may thus be positioned with respect to each other so as to allow, during the operation of the turbine engine, for example during a low speed operation, a time and/or spatial phase shift of the interaction between the first blade 21 and the blades 2002 of the second bladed wheel 2000 and the interaction between the second blade 22 and the blades 2002 of the second bladed wheel 2000.

In the case of a turbine engine with two bladings positioned along the axis of the turbine engine according to the prior art, the blades of each bladed wheel having the same tilt, typically in the case of an unducted fan and/or with contra rotative bladings, an interaction noise results from the operation of both bladings which is the consequence of the impact of the wakes 81 and of the vortices 82 from blades of the bladed wheel positioned upstream with the blades of the bladed wheel positioned downstream.

This interaction noise is one of the main sources of the noise perceived in the approach and take—off phases. This interaction noise is very pronounced, in particular in the case of turbine engines with an unducted fan and contra rotative bladed wheels, even more in the particular case when all the blades are identical.

The interaction between the upstream and downstream bladings of the turbine engine is reproduced at each crossing between the blades of the bladed wheel upstream and of the bladed wheel downstream. The result of this is an acoustic signature marked on discrete frequencies corresponding to combinations of the blade passing frequencies of the bladed wheel upstream and of the bladed wheel downstream of the type $n*BPF_1+m*BPF_2$ with $BPF_i$ the blade passing frequency of the bladed wheel i as described earlier with n and m being natural integers.

This is most pronounced for the unducted fans, the noise of which is estimated as substantially greater than the one emitted by the conventional ducted fan. One of the reasons is the absence of a nacelle surrounding the bladed wheels, a nacelle which conventionally gives the possibility of masking and/or attenuating a portion of the acoustic radiation generated by the blades as well as the interaction phenomena marked between the bladed wheels by the use of acoustic treatments positioned in the conduit, on the walls of the nacelle.

In order to reduce this interaction noise, the possibilities conventionally provided to one skilled in the art consist according to the prior art of optimizing the identical aerodynamic profile for each of the blades of a bladed wheel. This means acting on the intensity of the pressure fluctuations resulting from the interactions between blades 2 by optimizing the shape of the profiles or the distribution of load on the extension of the blade 2 in order to modify the influence of the head vortex. For example, it is possible to avoid the impact of the head vortex of the upstream propeller with the blades of the downstream propeller by truncating the latter but this is done to the detriment of the aerodynamic performances at a high speed. Further, the optimization of the profiles for minimizing the wakes from the upstream bladed wheel on the critical operating points towards the acoustic certification implies a modification of the shape of the profiles by increasing their curvature in order to reduce the incidence of work of the profiles on these low speed mission points. This adaptation of the profiles intended for acoustics, goes against the aerodynamic optimization at a high speed for which the transonic behavior of the profiles require a low curvature of the latter.

The adaptations of the profiles according to known methods of the prior art for minimizing the interaction noise therefore prove to complex and delicate since they impact in a detrimental way the high speed yield of the propellers thereby degrading the fuel consumption on a mission.

The turbine engine described here according to an exemplary embodiment of the invention with the first bladed wheel 1000 and the second bladed wheel 2000 gives the possibility of reducing the intensity of the interaction noise by modifying aerodynamic interactions between the first bladed wheel 1000 and the second bladed wheel 2000.

It is thus possible to modify the space-time characteristics of the interaction of the wakes from the bladed wheel positioned upstream with the blades of the bladed wheel positioned downstream. This modification of the interactions is accomplished by introducing the space and/or time phase shift of the interactions differentiating the influence from or received from the first blades 21 with respect to the second blades 22 of the same first bladed wheel 1000.

If the first bladed wheel 1000 is positioned upstream, these are influences from the blades since the wakes stem from them. These differences in tilt give the possibility of generating different wakes between a first blade 21 and a second blade 22 so as to both generate a different interaction during the crossing with the blades of the second bladed wheel 2000 downstream but also a space and/or time phase shift with respect to an identical interaction on all the blades 2 of the second bladed wheel 2000 downstream.

If the first bladed wheel 1000 is positioned downstream, these are influences received by the blades since the wakes from the second bladed wheel 2000 upstream interact differently with the first blades 21 and with the second blades 22. These tilt differences give the possibility to the wakes to generate different interactions between a first blade 21 and a second blade 22 and a space and/or time phase shift with respect to an identical interaction on all the blades of the bladed wheel downstream.

In both cases, this space-time phase shift may give the possibility of reducing the global acoustic signature of the doublet of propellers by is authorizing different recombinations of the sound sources along the direction of observation. A notable reduction in the perceived noise level may thus be obtained.

The upstream bladed wheel and the downstream bladed wheel may both have first bladed wheels 1000 as described earlier, i.e. that each comprises at least one first blade 21 having a first tilt as indicated above and at least one second blade having a second tilt different from the first tilt. It is thus possible to benefit from these tilt differences both on the upstream bladed wheel and on the downstream bladed wheel in order to reduce by as much the perceived noise from each bladed wheel individually like interactions between both bladed wheels.

As compared with configurations of the prior art, the turbine engine described here allows spatial and time disorganization of the interactions between the wakes from the upstream bladed wheel and the blades of the downstream bladed wheel. Such that disorganization allows a potential reduction in the interaction noise at a lesser cost since the blades used for a same bladed wheel may remain with an identical geometrical shape.

Thus, it is not necessary to produce two different blade forms and it is not necessary to resort to a double reference during the mounting of the turbine engine.

Further, as described above, this untuning may only be substantially active for flight configurations requiring a particular attention for the acoustics, notably at a low speed.

Further, such a modification of the bladings is easy to apply since the modification of the space positioning of the blades within the bladed wheel at a low speed is simply produced by the rotation around the axis for changing pitch having a tangential component and/or a component towards the upstream side or towards the downstream side. This modification of the space position is however performed without modifying substantially the pitch of the profiles with constant radius, which ensures a minor modification of the aerodynamic operation.

Exemplary Embodiments

With reference to FIG. 12, contra rotative bladed wheels according to the prior art and according to exemplary embodiments of the invention are described, in the case when the upstream bladed wheel is the first bladed wheel 1000 comprising at least a first blade 21 and at least a second blade 22, the first blade 21 being for example positioned between two second blades 22.

The first bladed wheel 1000 upstream rotates at a first speed and in a first direction $\omega_1$. The second bladed wheel 2000 rotates at a second speed and in a second direction $\omega_2$ opposite to the first direction $\omega_1$.

The first blade has two possible positions corresponding to two untuning examples by the first tilt of the axis of rotation $A_1$. The blade 210 represents the location for a bladed wheel of the prior art of the blade positioned between the two second blades 22, at an equal distance from both and without its axis of rotation $A_1$ being tilted with respect to the corresponding radial axis $A_2$.

According to the first example, the first blade 211 has a first tilt comprising a tangential component β so as to be tilted rearwards with respect to the direction of rotation of the first bladed wheel 1000.

According to the second example, the first blade 212 has a first tilt comprising a tangential component β so as to be tilted forwards with respect to the direction of rotation of the first bladed wheel 1000.

Two consecutive blades 2010 and 2020 of the second bladed wheel 2000 downstream are also illustrated. The blades of the bladed wheel 2000 are for example identical in shape and in tilt and uniformly distributed in an azimuthal way for the bladed wheel 2000, i.e. without any untuning.

The blade 2020 is illustrated at three instants t, t+Δt and t−Δt' in the engine reference system.

Thus, the blade referenced as 2020 represents the blade 2020 at instant t, the blade 2010 and the first bladed wheel being also represented at instant t. At this instant t, the wake from the non—tuned blade 210 of the upstream bladed wheel of the prior art would cross the blade 2020.

The blade referenced as 2021 represents the blade 2020 at instant t+Δt. At this instant t+Δt, the wake from the first blade 211 of the first bladed wheel 1000 of the first example, which has a first tilt of the axis of rotation of the blade comprising a tangential component β rearwards, crosses the blade 2020.

The blade referenced as 2022 represents the blade 2020 at the instant t−Δt'. At this instant t−Δt', the wake from the first blade 212 of the first bladed wheel 1000 of the second example, which has a first tilt of the axis of rotation of the blade comprising a tangential component β forwards, crosses the blade 2020.

The blade 2020 of the second bladed wheel 2000 positioned downstream, thus crosses the wakes of the first blades 21 untuned of the first bladed wheel 1000 positioned upstream or earlier (second example with the first blade 212) or later (first example with the first blade 211) with respect to the crossing of a wake from a non—untuned blade 210.

Therefore there is actually a time phase shift of the interaction between the first blades 21 of the first bladed wheel 1000 positioned upstream and the blades of the second bladed wheel 2000 positioned downstream, which is expressed by a different interaction frequency.

The wakes from the blade 210 of the prior art, from the first blade 211 and from the first blade 212 are different since although these blades retain an incidence close because of their identical pitch, the volumes of the latter will be different on the one hand because of the tilt, the shown stacking is different, and on the other hand the path of the wake before impact on the upstream blade will be more or less long because of the first tilt which has a tangential component and/or a component towards the upstream side or towards the downstream side.

The pressure fluctuation resulting from the crossing of the blades of the first bladed wheel 1000 and of the second bladed wheel 2000 is is therefore different according to the untuning of the first blades 21 and therefore has a time phase shift which is also itself different.

Further, the crossing of the wake with the blades of the bladed wheel downstream taking place at different instants (t; t+Δt, t−Δt'), the pressure fluctuation will spatially occur at different positions of the bladed wheel downstream.

A phase shift of the acoustic sources from one blade to the other, on the same bladed wheel, thereby ensures a potential reduction at the interaction noise level.

The invention claimed is:

1. A turbine engine comprising:
a bladed wheel with variable pitches comprising:
a plurality of blades, each with a variable pitch along an axis of rotation of a blade and each having a root, the plurality of blades comprising at least one first blade and at least one second blade; and
a plurality of rotor connection shafts, each rotor connection shaft having a root and a head, the root of each blade being mounted on the head of a corresponding rotor connection shaft through a pivot so as to allow the rotation of each blade along the blade rotation axis,
wherein the first blade has a first tilt of the axis of rotation, such that the blade rotation axis of the first blade is tilted in a fixed way with respect to a radial axis of the bladed wheel passing through the root of the corresponding shaft, the first tilt of the axis of rotation including a first axial tilt component toward an upstream side or a downstream side with respect to a plane of the bladed wheel, and the second blade has a second tilt of the axis of rotation including a second axial tilt component toward the upstream side or the downstream side with respect to the plane of the bladed wheel, the second axial tilt component being different from the first axial tilt component; and
control means configured for modifying simultaneously in the first blade and the second blade respective pitches along the corresponding blade axis of rotation,
wherein the control means is configured for blocking the bladed wheel in a high speed position such that the position of the first blade with respect to the corresponding radial axis is the same as the position of the second blade with respect to the corresponding, radial axis, and
wherein the control means is configured for blocking the bladed wheel in a low speed position such that the position of the first blade with respect to the corresponding radial axis is different from the position of the second blade with respect to the corresponding radial axis.

2. The turbine engine according to claim 1,
wherein the first tilt of the axis of rotation comprises a tangential tilt component in the plane of the bladed wheel.

3. The turbine engine according to claim 1,
wherein each shaft corresponding to a first blade is tilted with respect to the radial axis, tilting the first corresponding blade according to the first tilt of the axis of rotation.

4. The turbine engine according to claim 1,
wherein each shaft corresponding to a first blade has a joint tilting the head of the shaft with respect to the remainder of the shaft, and tilting the first corresponding blade according to the first tilt of the axis of rotation.

5. The turbine engine according to claim 1,
wherein the first blade and the second blade have a same geometrical shape.

6. The turbine engine according to claim 1, wherein the second blade has a second blade tilt different from the first blade tilt.

7. The turbine engine according to claim 1, wherein the first blade has a first root and the second blade has a second root,
the first root and the second root being in a same plane perpendicular to the axis of the bladed wheel.

8. A turbine engine comprising:
a first bladed wheel with variable pitches comprising:
a plurality of blades, each with a variable pitch along an axis of rotation of a blade and each having a root, the plurality of blades comprising at least one first blade and at least one second blade; and
a plurality of rotor connection shafts, each rotor connection shaft having a root and a head, the root of each blade being mounted on the head of a corresponding rotor connection shaft through a pivot so as to allow the rotation of each blade along the blade rotation axis,
wherein the first blade has a first tilt of the axis of rotation, such that the blade rotation axis of the first blade is tilted in a fixed way with respect to a radial axis of the bladed wheel passing through the root of the corresponding shaft, the first tilt of the axis of rotation including a first axial tilt component toward an upstream side or a downstream side with respect to a plane of the bladed wheel, the second blade has a second tilt of the axis of rotation including a second axial tilt component toward the upstream side or the downstream side with respect to the plane of the bladed wheel, the second axial tilt component being different from the first axial tilt component; and
a second bladed wheel, the second bladed wheel comprising a plurality of blades, the first bladed wheel being positioned upstream or downstream from the second bladed wheel along an axis of the turbine engine,
the first bladed wheel and the second bladed wheel being configured for generating, during an operation of the turbine engine, at least one of a time phase shift or a space phase shift of an interaction between the first blade of the first bladed wheel and the blades of the second bladed wheel, with respect to an interaction between the second blade of the first bladed wheel and the blades of the second bladed wheel.

9. The turbine engine according to claim 8, wherein the first bladed wheel and the second bladed wheels have at least one of different speeds or different directions of rotation.

10. An aircraft comprising a turbine engine according to claim 8.

* * * * *